United States Patent [19]

Serrone

[11] Patent Number: 4,989,220
[45] Date of Patent: Jan. 29, 1991

[54] METHOD AND APPARATUS FOR DEMODULATING A CLASS OF M-ARY PHASE SHIFT KEYED (PSK) SIGNALS

[75] Inventor: Michael J. Serrone, Sunnyvale, Calif.

[73] Assignee: First Pacific Networks, Sunnyvale, Calif.

[21] Appl. No.: 317,167

[22] Filed: Feb. 28, 1989

[51] Int. Cl.$^5$ ............................................. H04L 27/22
[52] U.S. Cl. ..................................... 375/83; 329/304; 375/85
[58] Field of Search .................................... 375/82–84, 375/86, 85; 329/118, 112, 110, 145, 304, 345

[56] References Cited

U.S. PATENT DOCUMENTS

| | | | |
|---|---|---|---|
| 3,387,220 | 6/1968 | Lender | 329/145 |
| 3,891,927 | 6/1975 | Filaferro et al. | 375/82 |
| 4,121,050 | 10/1978 | Witt | 375/86 |
| 4,618,830 | 10/1986 | Mori et al. | 375/84 |
| 4,715,047 | 12/1987 | Hambley | 375/84 |

OTHER PUBLICATIONS

*Digital Communications—Satellite/Earth Station Engineering*, Kamilo Feher, (Prentice-Hall, 1983, pp. 170–171).

Primary Examiner—Benedict V. Safourek
Assistant Examiner—Marianne Huseman
Attorney, Agent, or Firm—Townsend and Townsend

[57] ABSTRACT

A method and an apparatus for demodulating M-ary PSK signals of the type wherein the modulation is limited to phase transitions between adjacent phase states. The method is operative in a demodulator which comprises a phase splitter dividing a source signal into two paths with a preselected phase relationship among phases, one of the phases being delayed by nominally one bit period, a mixer or multiplier receiving as one input a representation of the delayed-phase component and as a second input a representation of the other phase component. A signal is filtered by a lowpass filter and provided to at least one corresponding two-level comparator, each of which produces a digital output. Digital logic circuitry responds to the digital outputs of each of the comparators to map the digital outputs into a single digital bit stream of ones and zeros.

8 Claims, 4 Drawing Sheets

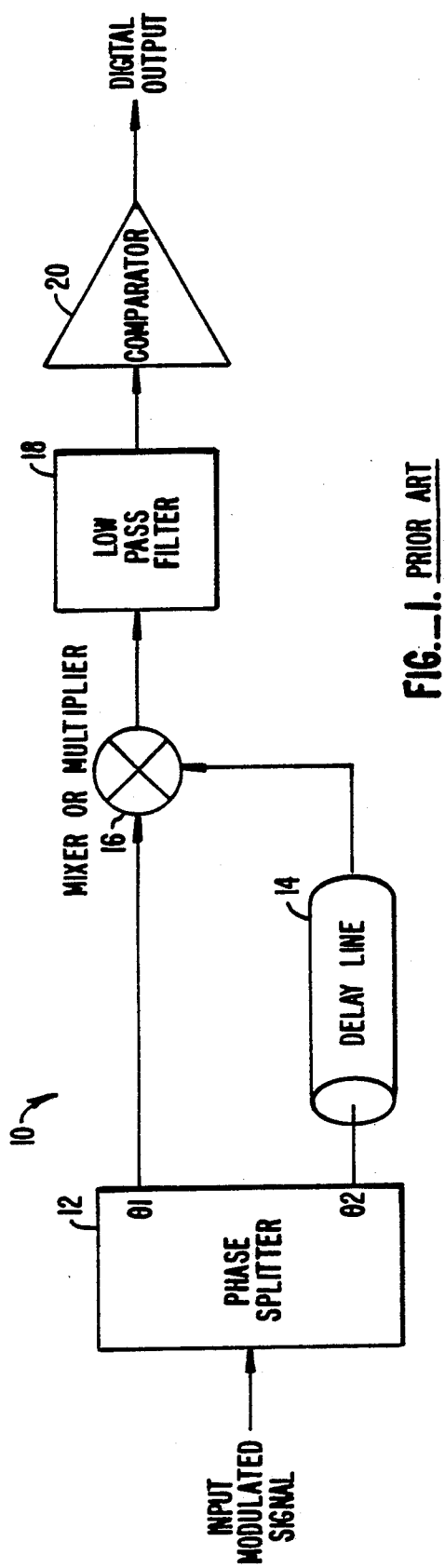
FIG._1. PRIOR ART
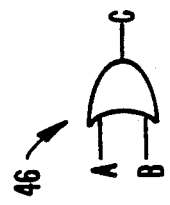
FIG._5.

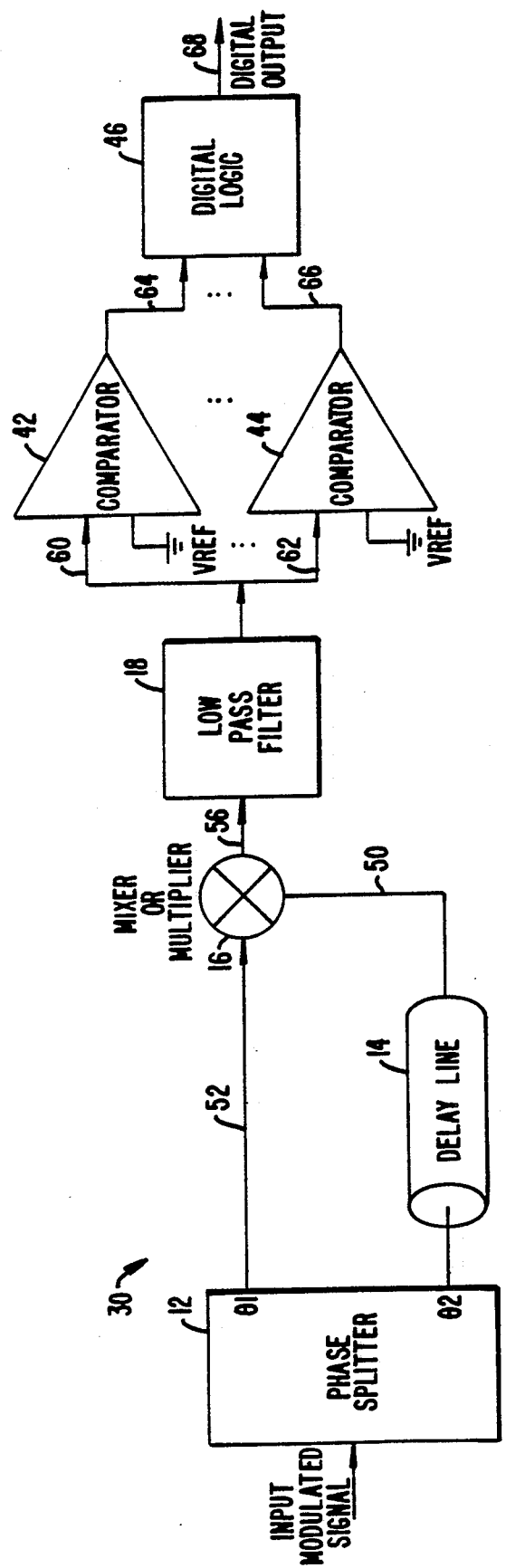
FIG._2.

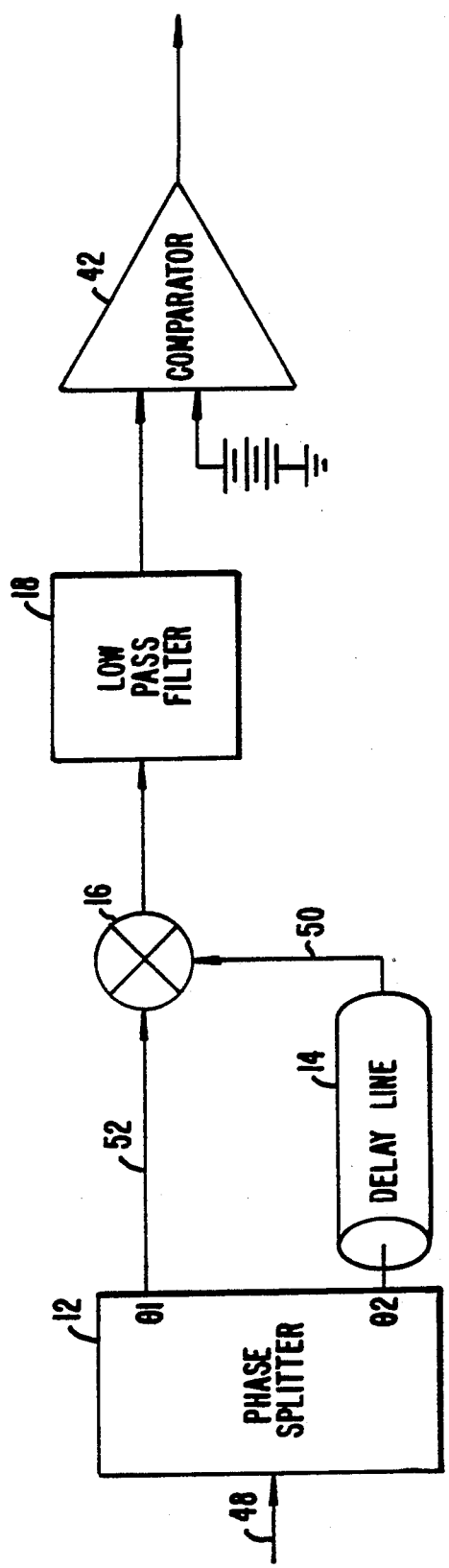
FIG._3.

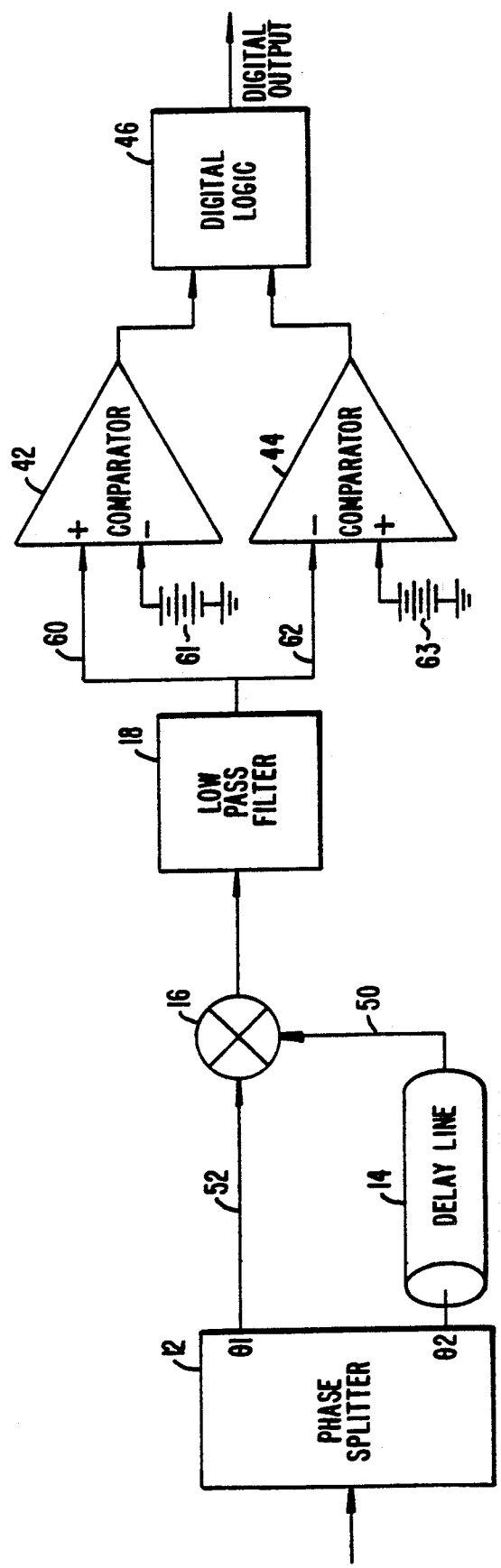
FIG._4.

METHOD AND APPARATUS FOR DEMODULATING A CLASS OF M-ARY PHASE SHIFT KEYED (PSK) SIGNALS

BACKGROUND OF THE INVENTION

This invention relates to demodulation of a class of M-ary PSK signals, and more particularly, to apparatus and methods for demodulating a large class of digital phase shift keyed modulated signals wherein phase change is limited to adjacent phase states.

Digital phase shift keyed signals (PSK signals) find wide application in communication. The signals are produced by discrete changes in phase of a periodic waveform. Phase is changed in accordance with a serial digital data stream acting as a control signal. The present invention has particular application to PSK signals wherein modulation is limited to phase transitions between adjacent phase states.

Prior art PSK modulation schemes have required demodulators whose complexity is proportional to the complexity of the modulated signal. For example, a binary PSK signal requires a relatively simple demodulator consisting of a single channel with a single multiplier used in connection with a local phase reference. A quadrature phase shift keyed (QPSK) signal on the other hand, has in the past required two phase references and two multipliers. As the number of phases increases, so also does the complexity of the circuitry which is used to synchronize the locally-generated phase reference. The locally-generated reference takes a finite time to become synchronized, which causes the first portion of a message to not demodulate properly during burst mode transmission. Such circuitry is complex and potentially expensive, but in the past has been necessary to provide a sufficient margin in the required signal-to-noise ratio for a given bit-error rate.

FIG. 1 shows a typical prior art bipolar phase shift keyed (BPSK) demodulator 10 suitable for demodulating burst mode BPSK transmissions. Referring to FIG. 1, a demodulator 10 employs a phase splitter 12 providing as two outputs a first phase component $\theta_1$ and a second phase component $\theta_2$, wherein the second phase component is provided through a short delay line 14 (providing a nominal delay of one bit period), the output of the first phase component and the second phase component being mixed together in a mixer or multiplier 16 to produce a baseband bit stream to be directed through a lowpass filter 18. The output of the lowpass filter 18 is suitable for application to a two-level comparator 20, which is used to produce a stream of ones and zeroes as a digital output.

Quadrature phase shift keyed modulation has required more complex demodulators. An example is found in the textbook *Digital Communications—Satellite/Earth Station Engineering*, by Kamilo Feher, (Prentice-Hall, 1983), pp. 170-171. Therein is described a differential offset QPSK demodulator and a differential QPSK demodulator. In this demodulator, the in-phase (I) output and the quadrature-phase (Q) output are separately converted into digital levels before recombination into a serial data stream. The recombination requires a priori knowledge of the bit clock phase. This demodulator only works for QPSK signals. It is believed that there have never before been such simple demodulators for higher order M-ary PSK signals.

What is needed is a simple demodulator for QPSK which eliminates ambiguity of reinterleaving the signals and which can be used with M-ary PSK signals in situations where signal-to-noise ratio is not a primary consideration and which can also produce valid data with minimal delay from the start of transmission.

SUMMARY OF THE INVENTION

According to the invention, a method and an apparatus are provided for demodulating M-ary PSK signals of the type wherein the modulation is limited to phase transitions between adjacent phase states. The method is operative in a demodulator which comprises a phase splitter dividing a source signal into only two paths with a preselected phase relationship between phases, one of the phases being delayed by nominally one bit period, a single mixer or multiplier receiving as one input a representation of the delayed-phase component and receiving as a second input a representation of the other of the phase components. The output signal is coupled to at least one two-level comparator, each of which produces a digital output. Digital logic circuitry responds to the digital outputs of each of the comparators to map the digital outputs into a single digital bit stream of ones and zeroes. The resultant loss of margin and the signal-to-noise ratio is offset by corresponding simplification of the demodulation circuitry and cost savings. However, the spectral efficiency of a complex M-ary PSK signal is retained.

BRIEF DESCRIPTION OF THE DRAWINGS

FIG. 1 is a schematic block diagram of a BPSK demodulator suitable use accordance with the prior art.

FIG. 2 is a schematic block diagram of a general M-ary PSK demodulator in accordance with the invention.

FIG. 3 is a schematic block diagram of a portion of a first specific DOQPSK demodulator.

FIG. 4 is a schematic block diagram of a portion of a second specific DOMPSK demodulator.

FIG. 5 is a schematic diagram of digital logic circuitry for decoding the outputs of comparators of the example of FIG. 4.

DESCRIPTION OF SPECIFIC EMBODIMENTS

Referring to FIG. 2, there is shown a specific embodiment of a demodulator 30 in accordance with the invention. The demodulator 30 has a phase splitter 12 producing two outputs, a single delay line 14, a single mixer 16, and a lowpass filter 18. In accordance with the invention, each specific embodiment of the invention has a selected number of output channels 60, 62 from the lowpass filter 18 whose signals are coupled to two-level comparators. Specifically as shown in FIG. 2, there is a first comparator 42, a second comparator 44 and digital logic circuitry 46, as hereinafter explained.

The phase splitter 12 has a single analog signal input 48 for receiving a modulated signal dividing a source signal into only two paths with a preselected phase relationship between the two phases, usually in quadrature relationship, one of the phases being delayed by nominally one bit period through the delay line 14 or its equivalent, such as a charge-coupled device (CCD). At this stage of the demodulator 30, the full spectrum of frequency components should be preserved such that the signal can be demodulated. The mixer 16 may be a multiplier receiving on one input line 50 a representation of the delayed-phase component and on a second input line 52 a representation of the other of the phase components from the phase splitter 12. The delay of the delay line 14 is applied to the 90° phase line, and the nominal delay is one bit and the phase delay is a multiple of 360° at the carrier frequency of the input at input port 48.

A mixed signal on signal line 56 is provided by the mixer 16 to a lowpass filter 18, whereby the combined signal is filtered to remove extraneous high-frequency components. The filtered signal is then coupled on signal lines 60 and 62 to corresponding two-level comparators 42 and 44, each of which responds to produce a respective digital binary-level output on output lines 64 and 66 to digital logic circuitry 46. The digital logic circuitry 46 responds to the digital outputs of each of the comparators 42 and 44 to map the digital outputs into a single digital bit stream of ones and zeroes on output line 68. This demodulator works with the special case of M-ary PSK where the phase transitions are limited to adjacent phase states. The circuit herein is a general case with a minimum number of circuit elements and required phase components.

An example is useful for understanding the operation of the invention and the function of the components in the specific embodiment. Referring to FIG. 3, a first example is Differential Offset Quadrature Phase Shift Keyed (DOQPSK) modulation wherein transitions are only between adjacent phase states. Consider an input signal having modulated phases shifted +90°, 0° and −90° applied to dual phase-phase phase splitter 12 through input port 48.

The phase splitter 12 produces fixed-phase-shifted outputs of $\theta_1 = +0°$ and $\theta_2 = -0°$. The delay line 14 length is one bit with a 0° net phase shift (e.g., 720°). An error of +/−15% on delay and net +/−15° in phase is not critical and is therefore considered to be within the meaning of one bit delay with zero net phase shift. The following is the transfer characteristic for unity voltage at the two phase outputs of the phase splitter 12:

| Phase change at input 48 | Mixer 16 Voltage Out | Logic Level Out |
|---|---|---|
| (a) 0° to 90° | 0.0 | 0 |
| (b) 0° to −90° | 0.0 | 0 |
| (c) 0° to 0° | 1.0 | 1 |

Referring to FIG. 3 showing a specific example, the output of the lowpass filter 18 is applied directly to a single comparator 42, since further comparators are unnecessary in the case of DOQPSK. The logic level output of the comparator 42 in the above example is shown in the right-hand column of the above table. From the above, it is seen that for the case of DOQPSK, the use of a comparator to hard limit the output at a decision level of 0.5 Volt will reconstruct the original data. Digital logic circuitry 46 is unneeded to decode the output of a single comparator, such as the comparator 42. Hence, the output of the comparator 42 is the desired digital data stream.

A single output of the lowpass filter 18 can be coupled to the inputs of two standard dual-input comparators 42, 44 (shown in generalization in FIG. 2). In such a configuration, more complex differential offset M-ary Phase Shift Keyed (DOMPSK) modulation can be analyzed with simple circuitry. An example follows:

Referring to FIG. 4, a second example is an Offset M-ary Phase Shift Keyed (OMPSK) modulation wherein transitions are only between adjacent phase states. Consider an input signal having modulated phases shifted $+\Delta°$, $0°$ and $-\Delta°$ applied to the phase splitter 12 through input port 48. The following are the transfer characteristics for unity voltage at the output of the phase splitter where the differential phase shift is less than 180° but not exactly 90°:

The phase splitter 12 produces fixed-phase-shifted outputs of $\theta_1 = +90°$ and $\theta_2 = 0°$.

| Phase change at input 48 | Mixer 16 Voltage Out | Mixer 16 V Out ($\Delta = 45°$) | Logic Level Out ($\Delta = 45°$) |
|---|---|---|---|
| (a) 0° to $+\Delta°$ | COS 90 + $\Delta°$ | COS 135° | 1 |
| (b) 0° to $-\Delta°$ | COS 90 − $\Delta°$ | COS 45° | 1 |
| (c) 0° to 0° | COS 90° = 0 | COS 90° | 0 |

The single output of the lowpass filter 18 is applied on lines 60 and 62 to a positive-referenced input of a first comparator 42 and a negative-reference input of a second comparator 44, respectively, each of which is independently referenced to different voltage references 61, 63 of equal magnitude but opposite polarities. The output of the comparators 42 and 44 in the above example thus depends on the magnitude of $\Delta$ to determine the binary logic levels for cases (a), (b), and (c). A specific example is shown above. The logic level outputs of each of the comparators 42 and 44 and the final logic level output in the above example is given by the following table:

| Case | Comparator 42 | Comparator 44 | Logic Out |
|---|---|---|---|
| (a) | 1 | 0 | 1 |
| (b) | 0 | 1 | 1 |
| (c) | 0 | 0 | 0 |

From the above, it is seen that for the case of OMPSK, the summing of outputs with equal weights and use of a comparator to hard limit the output at decision levels of $(\frac{1}{2})COS(+90+\Delta)$ Volt and $(\frac{1}{2})COS(90-\Delta°)$ Volt, the apparatus will reconstruct the original data if appropriate digital logic circuitry 46 is employed. Simple digital logic circuitry 46 is needed to decode the output of two comparators, such as the comparators 42 and 44.

Referring to FIG. 5, there is shown one suitable circuit for digital logic circuitry 46 in accordance with the invention. The digital logic circuitry 46 is merely a two-input OR gate. In a more general case, the digital logic circuit 46 would be of a design to provide decoding of signals from a plurality of comparators into a single digital data bit stream. In such a configuration, more complex differential and nondifferential offset M-ary Phase Shift Keyed modulation can be demodulated with simple circuitry.

The invention has now been described with reference to specific embodiments. Other embodiments will be apparent to those of ordinary skill in the art. For example, the method according to the invention can be practiced in a special case wherein phase changes are limited to a plurality of selected phase states between +90° and −90° relative to an initial phase state. In such special cases, comparing comprises identifying each phase state by means of a group of comparators 42, 44 (FIG. 2), the number of individual comparators 42, 44 being one less than the number of possible phase states. It is therefore not intended that this invention be limited, except as indicated in the appended claims.

I claim:

1. A method for demodulating a modulated M-ary phase shifted keyed (MPSK) signal where M is greater than 2 and wherein modulation is constrained to phase transitions between adjacent phase states, said method comprising the steps of:
   dividing a source signal into two paths differing by a preselected phase relationship other than zero degrees of 180 degrees among a first phase component and a second phase component;
   delaying said second phase component by nominally one bit period to produce a delayed-phase component;
   mixing a representation of the delayed-phase component and said first phase component to produce a mixed signal;
   low-pass filtering said mixed signal to produce a filtered signal; and
   comparing said filtered signal against a plurality of preselected decision thresholds in at least one comparator means to produce a digital output signal.

2. The method according to claim 1 wherein phase changes are limited to selected phase states between $+90°$ and $-90°$ relative to an initial phase state, and wherein said comparing step comprises identifying each phase state by means of individual comparators, the number of said individual comparators being one less than the number of possible adjacent phase states.

3. A method for demodulating a modulated M-ary phase shift keyed (MPSK) signal wherein modulation is constrained to phase transitions between adjacent phase states, said method comprising the steps of:
   dividing a source signal into two paths with a preselected phase relationship among a first phase component and a second phase component;
   delaying said second phase component by nominally one bit period to produce a delayed-phase component;
   mixing a representation of the delayed-phase component and said first phase component to produce a mixed signal;
   low-pass filtering said mixed signal to produce a filtered signal;
   comparing said filtered signal against different preselected decision thresholds in at least two comparator means to produce a digital output signal;
   identifying different signal levels of said mixed signal; and
   analyzing said different signal levels of said two-level comparator means in order to combine said outputs of said two-level comparator means to produce said digital output signal.

4. The method according to claim 3 wherein exactly two two-level comparator means are provided, and wherein said analyzing step is implemented in digital logic circuit means comprising a two-input OR gate, wherein a first input is coupled to receive output of a first two-level comparator means and a second input is coupled to receive output of a second two-level comparator means.

5. An apparatus for demodulating a modulated M-ary Phase Shifted Keyed signal where M is greater than 2 and wherein modulation is constrained to phase transitions between adjacent phase states, said apparatus comprising:
   a phase splitter means for dividing a source signal into two paths differing by a preselected phase relationship other than zero degrees or 180 degrees among a first phase component and a second phase component;
   a delay means coupled to receive as an output said second phase component from said phase splitter, said second phase component being delayed by nominally one bit period at an output of said delay means as a delayed-phase component;
   a mixer coupled to receive as one input a representation of the delayed-phase component and a second input a representations of said first phase component to produce a mixed-signal;
   lowpass filter means coupled to receive said mixed signal for producing a filtered signal; and
   at least one two-level comparator means, each one of said two-level comparator means being coupled to receive said filtered signal to produce a digital output signal.

6. The apparatus according to claim 5 wherein exactly two two-level comparator means are provided, and further comprising digital logic circuit means comprising a two-input OR gate, wherein a first input is coupled to receive output of a first two-level comparator means and a second input is coupled to receive output of a second two-level comparator means.

7. An apparatus for demodulating an M-ary Phase Shift Keyed modulated signal wherein modulation is constrained to phase transitions between adjacent phase states, said apparatus comprising:
   a phase splitter means for dividing a source signal into two paths with a preselected phase relationship among a first phase component and a second phase component;
   a delay means coupled to receive as an output said second phase component from said phase splitter, said second phase component being delayed by nominally one bit period at an output of said delay means as a delayed-phase component;
   a mixer coupled to receive as one input a representation of the delayed-phase component and a second input a representation of said first phase component to produce a mixed signal;
   lowpass filter means coupled to receive said mixed signal for producing a filtered signal;
   at least two two-level comparator means, each one of said two-level comparator means being coupled to receive said filtered signal and being referenced to a different reference level to produce a digital output signal, for identifying different signal levels of said mixed signal; and
   digital logic circuit means coupled to receive outputs of said two-level comparator means in order to combine said outputs of said two-level comparator means to produce said digital output signal.

8. The apparatus according to claim 7 wherein exactly two two-level comparator means are provided, and wherein said digital logic circuit means comprises a two-input OR gate, wherein a first input is coupled to receive output of a first two-level comparator means and a second input is coupled to receive output of a second two-level comparator means.

* * * * *